Dec. 16, 1969  W. J. CAGLE  3,484,119
LOAD EQUALIZING ASSEMBLY

Filed Jan. 22, 1968  2 Sheets-Sheet 1

INVENTOR
WESLEY J. CAGLE
BY
Geo. J. Muckenthaler ATT'Y

INVENTOR
WESLEY J. CAGLE

# United States Patent Office 3,484,119
Patented Dec. 16, 1969

3,484,119
LOAD EQUALIZING ASSEMBLY
Wesley J. Cagle, Huntsville, Ala., assignor to J. I. Case Company, Racine, Wis., a corporation of Wisconsin
Filed Jan. 22, 1968, Ser. No. 699,706
Int. Cl. B62d 37/00; B60g 25/00
U.S. Cl. 280—111                                     8 Claims

ABSTRACT OF THE DISCLOSURE

An equalizing assembly for ground engaging wheels carrying an implement having a frame and a rockshaft, the wheels being independently connected to the frame and the shaft, and the assembly including a member pivotally connected to the wheels and pivotable lengthwise on the shaft. The member is connected to and supports the wheel arms to permit one wheel to be raised and the other wheel to be lowered an equal amount for maintaining distribution of the load on the wheels.

BACKGROUND OF THE INVENTION

As implements and machines become wider and longer, there is a need for increasing the number of supporting wheels so as to spread the load more evenly across the frame. In the case of implements, the wider frames require additional ground wheels for strength and stability in carrying the load. As is well-known, both dual and tandem wheels are used on large trucks, airplanes, and the like, and since it is desirable to spread the load over additional wheels and also to maintain a low silhouette, the use of very large and very wide wheels has been restricted in certain applications. As is also known in the case of tandem wheels, a tie mechanism has been provided between the wheels such that the front and rear wheels of the tandem are independently allowed to rise and fall due to uneven surfaces.

In the case of implements for working in row crops, a dual wheel arrangement is not always desirable since the width of the two wheels may limit the row width adjustment. With the advent of varying row widths, such as 20", 30", or 40" spacing between rows, the dual wheel width would restrict the positioning and adjusting of the wheels so that they would not properly travel between the rows when it is required to re-position the wheels for a different row spacing. It is therefore desirable to provide a means whereby the wheels are spaced across the machine acceptable for different row spacing and at the same time to maintain equal loading on the wheels. In the present application, the apparatus is shown and described as a trail type toolbar for implements, and the width of these bars may be as much as 40 feet so the number of wheels disposed along the frame must be increased to provide for the increased weight and for better stability.

SUMMARY OF THE INVENTION

The present invention relates to a wheel assembly for implements and more particularly to an equalizing arrangement whereby the load is more evenly distributed on the wheels. The ground engaging wheels are spaced from each other and are independently connected to the implement frame by means of wheel arms. The frame of the implement takes the form of a toolbar to which are attached bearing mounts for a rockshaft normally disposed above the bar. The wheel arms are pivotally connected to a bracket attached to the toolbar. A yoke is connected to the wheels arms of each wheel and extends upwardly over the wheel to a link which is pivotally connected to a member which in turn is attached to the rockshaft. A hydraulic cylinder rotates the rockshaft and the ground wheels are raised or lowered in respect to the frame by reason of the connecting arms and links.

An equalizing member is positioned above the toolbar and is pivotally connected to the ends of the links extending from the wheel yokes. This member is strapped to the rockshaft at its mid-point and is adaptable to pivot lengthwise on the shaft. The member includes a bar having sloping surfaces for riding and balancing on the shaft. The equalizer arrangement between the wheels prevents uneven loading along the toolbar when encountering uneven or irregular surfaces. As is known in the case of dual wheels, if one wheel dropped into a hole or rolled over a stone, the other wheel being on a common axle would follow the up-and-down movement and all of the load would be forced onto one wheel.

The present invention provides for distributing the load on at least two wheels by means of the equalizer member permitting, in the case of uneven ground surfaces, one wheel to raise as the other is lowered by an equal amount. The load transmitted from the frame to each of the wheels therefore remains substantially the same amount.

An object of the present invention is to provide an equalizing assembly for spaced ground wheels such that the wheels are independently suspended and the load is equalized onto the wheels.

Other advantages and features will become apparent from a reading of the following description taken together with the annexed drawings, in which.

Figure 1:
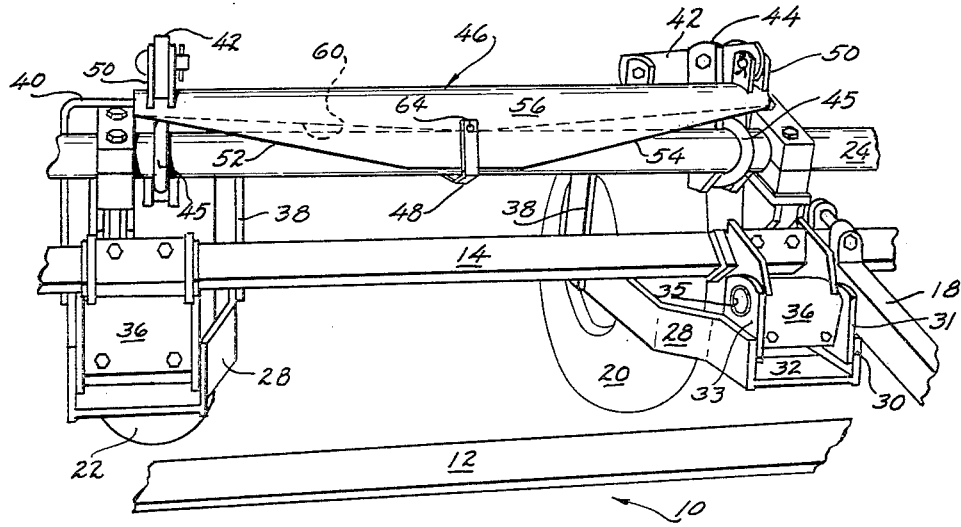
FIGURE 1 is a front view of a portion of a toolbar and rockshaft showing the equalizer member.
Figure 2:
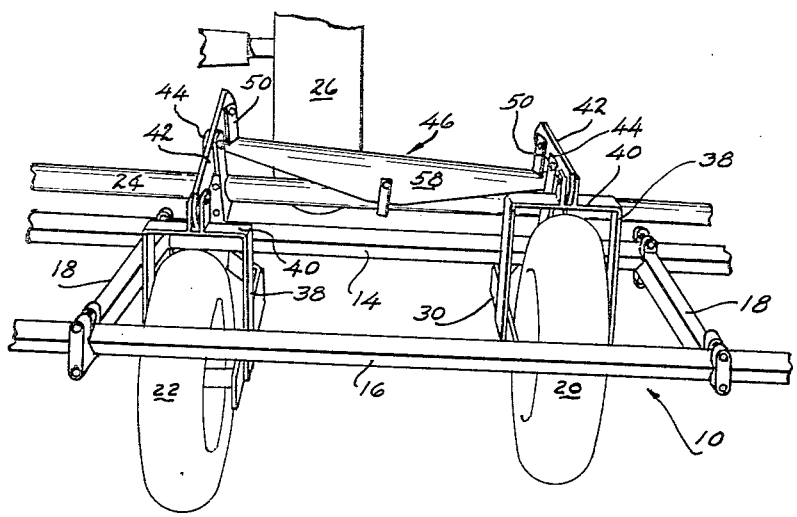
FIG. 2 is a rearward view of a pair of spaced wheels connected to the rockshaft and to the toolbar, and showing the equalizer member.
Figure 4:
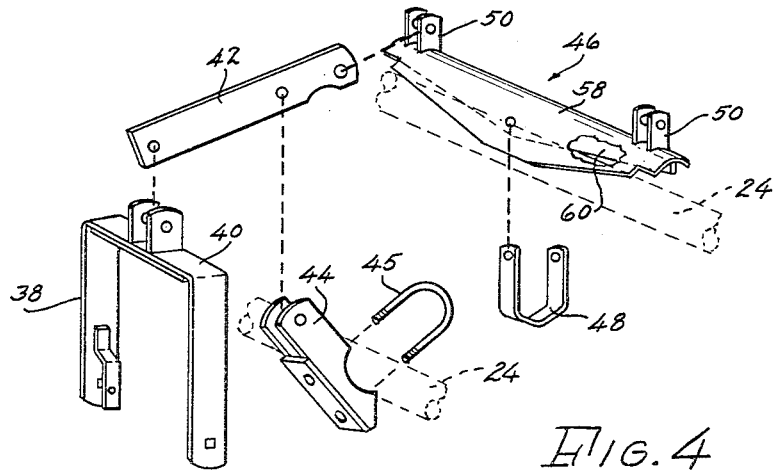
FIG. 4 is an exploded view of the equalizer parts.
Figure 3:
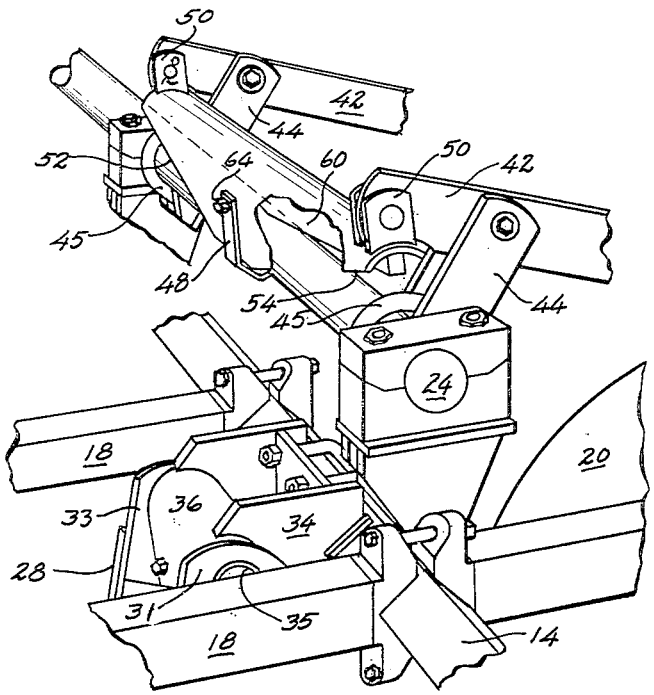
FIG. 3 is a perspective view of the rockshaft and equalizer assembly.

There is shown in FIGS. 1, 2, and 3 a portion of an agricultural implement including a frame generally designated as 10 and comprising toolbars 12, 14, and 16 with connecting members such as 18 to provide a rigid framework for carrying the implements. The toolbars may carry the conventional implements such as plows or furrow openers, seed planters, fertilizer attachment, and the like, and the entire machine includes hitch means for connection to a towing vehicle. The use of toolbars for carrying these implements is well known in the minimum tillage machine wherein there is flexibility of attaching the different parts. In the case of seed planters these bars are especially adaptable for varying the spacing between the implements to obtain the desired row width. It is a desirable feature and also convenient means for adjusting the spacing laterally along the toolbars to accommodate for and obtain 20 inch, 30 inch, or 40 inch rows or any figure between these row widths.

As stated above, the toolbar width has been increased to 40 feet or more, so that additional ground wheels must be provided to carry the load and also to stabilize the machine. In the area of minimum tillage, the seedbed is apt to be uneven so that a problem has been encountered wherein even the additional ground wheels do not always maintain the seed dispensing mechanism at the same elevation. Of course, the use of dual wheels suggests a more stable machine but these are susceptible to variations caused by irregular ground surfaces, as mentioned above. Therefore the use of spaced ground wheels tends to alleviate some of the circumstances due to variable row spacing but not entirely the problem of uneven surfaces.

The present invention provides for spaced ground wheels 20 and 22 carrying the toolbar frame and connected to a rockshaft 24. In FIG. 2 is shown a view looking in the direction of travel as readily seen by a portion of the towing tractor 26. In the particular embodiment, wheel 20 is generally a supporting wheel and wheel 22 includes drive mechanism for driving the parts of one or more implements. So that the location of the wheels 20 and 22 is clearly indicated and understood, the implement described has a set of spaced wheels near the sides of the frame, in other words a left and a right pair. The outer wheel 20 is the supporting wheel and the inner wheel 22 is the supporting and driving wheel, thus wheel 20 in FIG. 1 is the outer wheel on the left side of the implement, whereas the right wheel 20 in FIG. 1 is the outer wheel on the right side of the machine. The wheel set assemblies are otherwise similar as shown and described. The drive mechanism forms no part of the present invention so it will not be described further. Each wheel frame includes wheel arms 28 and 30 which extend forwardly along the side of the wheel and are joined by a flat member 32. The wheel frames also include upstanding lugs 31 and 33 secured to arms 28 and 30 respectively and a tubular element 35 is fixed in and spans the lugs. The wheels are individually journaled on suitable axles through the wheel arms to provide the supporting structure for the toolbar. A pivot bearing 34 for each wheel includes a U-shaped portion 36 adapted to fit over element 35 and the bearing is secured to the toolbar in rigid manner by means of U-bolts and an angular portion mating with two sides of the bar. In this manner the wheels and wheel frames are pivotable in bearing 34 as the frame of the implement is raised or lowered in relation to the ground.

Pivotally connected to the wheel arms is a yoke member 38, shown in FIG. 2, extending generally upwardly over the wheel and joined by yoke piece 40. A pivot link 42 is pinned to piece 40 and extends forwardly therefrom to an attaching arm or bracket 44. Bracket 42 has spaced segments and is secured by means of a U-bolt 45 to rockshaft 24. Pivot link 42 extends forwardly beyond the pin point with arm 44 to the equalizing member which is the connecting link between the two ground wheels. An equalizer member 46 is positioned on the rockshaft and pivotable thereon by means of a bolt and a strap 48, and member 46 has upstanding lugs 50 for pivotally connecting to the forward end of link 42. As seen in FIG. 3, arm 44 is connected intermediate the ends of link 42 so as to provide a rocking action which will be further described.

Member 46 is strapped lengthwise of rockshaft 24 and includes diverging surface portions 52 and 54. The member is of rounded or U-shaped construction and has fore and aft portions 56 and 58 which extend downwardly along the shaft. Member 46 has a sloping or V-shaped member 60 secured as by welding to the inside of the U-shaped portion. The member 60 generally follows the shape of the equalizer 46 and a bore is through the fore and aft portions and through the V-shaped member 60 for a bolt 64 which holds the equalizer on the rockshaft by means of the strap. The apex of the V rests on the top of the shaft and therefore the equalizer is capable of rocking or pivoting lengthwise on the shaft.

As seen in FIG. 2, the right side of the equalizer member 46 is lower than the left side so that some pivoting action is shown taking place. It is also seen that wheel 20 is upwardly from wheel 22 so that the wheels are not traveling at the same elevation. When this occurs, the equalizer member pivots on the rockshaft and the frame elevation is not affected by one wheel traveling higher than the other. If the wheels were tied together as in conventional dual wheel assemblies, one wheel would be subjected to all the load if it encountered a high spot and the other wheel was entirely off the ground.

The pivotal connection of the bracket 44 to the link 42 and to the rockshaft provides for a lever action and the effect is to float the supporting structure. Since the rockshaft 24 is journaled in bearings on the toolbar and since the wheel arms are secured to the toolbar, the brackets provide the pivotal action allowing the links to rise and fall with the wheels and with the equalizer member.

The equalizer assembly provides all the advantages and features of using spacing ground wheels and also to divide the load evenly on the wheels. It is thus seen that herein shown and described is a specific embodiment of the invention as adapted to a trail type toolbar carrier. Variations on the load equalizing assembly may occur to those skilled in the art and it is to be understood that all such variations are contemplated as being within the scope of the invention. The invention is not intended to be taken as limited by the embodiment disclosed, nor in fact, in any manner except as defined in the following claims.

What is claimed as new and desired to be secured by Letters Patent of the United States is:

1. A load equalizing assembly for an implement having a frame adaptable to be propelled by a vehicle, and including a pair of ground wheels, means interconnecting the wheels and the frame, a shaft journaled on said frame and disposed transverse to the direction of travel, a yoke member connected to each of said ground wheels, linkage means pivotally connected to each yoke member and to said shaft, a cross member on said shaft interconnecting the ends of said linkage means, said cross member being connected to and rockable on said shaft whereby the load from the frame is evenly distributed to the wheels.

2. An assembly in accordance with claim 1 wherein the ground wheels are spaced from and independent of each other.

3. An assembly in accordance with claim 1 including a pivot element secured to said cross member and having inclined surfaces attached for rocking on said shaft.

4. An assembly in accordance with claim 1 wherein said cross member includes fore and aft portions and a top connecting portion, the fore and aft portions extending partially around said shaft for connection thereto.

5. An assembly in accordance with claim 3 wherein said cross member includes strap means pivotally connecting the element and the shaft.

6. An assembly in accordance with claim 1 wherein said linkage means are connected to the shaft intermediate their ends.

7. In an agricultural implement having a frame adaptable to be propelled by a vehicle, spaced ground wheels carrying the frame and means for equalizing the load on the wheels, said equalizing means including a rockshaft journaled on the frame and extending transverse to the direction of travel of the implement, an upstanding yoke pivotally connected to each of said wheels, a pair of links each pivotally connected to its respective yoke, a pair of arms secured to said rockshaft and pivotally connected to the links, and a longitudinal member attached to said rockshaft and interconnecting the ends of the links and rockable lengthwise on the shaft.

8. In an implement according to claim 7 wherein the longitudinal member includes an element connected to and rockable on the shaft.

References Cited

UNITED STATES PATENTS 1,439,802   12/1922   De Miranda _____ 280—104

PHILIP GOODMAN, Primary Examiner

U.S. Cl. X.R.

280—104